United States Patent
Lo et al.

[11] Patent Number: 6,033,772
[45] Date of Patent: Mar. 7, 2000

[54] COCRNITA/CR MAGNETIC RECORDING MEDIUM

[75] Inventors: Yu-Yun Lo, Ping-tung Hsien; Tai-hwang Lai, Hsin-chu, both of Taiwan; James Liang, Piscataway, N.J.; Hung-huei Liang, Chang-hwa Hsien, Taiwan

[73] Assignee: Trace Storage Tech, Corp., Hsinchu, Taiwan

[21] Appl. No.: 08/964,523

[22] Filed: Nov. 5, 1997

[51] Int. Cl.⁷ .................................................. G11B 5/66
[52] U.S. Cl. ............... 428/332; 428/336; 428/694 T; 428/694 TS; 428/900; 427/128; 427/129; 427/130; 204/192.2
[58] Field of Search .................... 428/332, 336, 428/694 T, 694 TS, 900; 427/128–130; 204/192.2

[56] References Cited

U.S. PATENT DOCUMENTS

| | | | |
|---|---|---|---|
| 4,677,032 | 6/1987 | Robinson | 428/611 |
| 5,004,652 | 4/1991 | Lol | 428/611 |
| 5,049,451 | 9/1991 | Lol | 428/611 |
| 5,057,200 | 10/1991 | Lol | 204/192.15 |

Primary Examiner—Leszek Kiliman
Attorney, Agent, or Firm—W. Wayne Liauh

[57] ABSTRACT

A magnetic recording medium for use in making high-density computer hard disks. It contains: (a) an aluminum or Ni/P substrate; (b) a chromium underlayer on the substrate; (c) a four-component magnetic recording layer on the underlayer; and (d) a carbon protective layer on the magnetic recording layer. The magnetic recording layer comprises 66–78 atom percent of cobalt, 12–16 atom percent of chromium, 6–10 atom percent of nickel, and 4–8 atom percent of tantalum. The CoCrTiTa four-component exhibits a high coercivity (greater than 2,800 Oe), which results in many improved qualities, including increased recording density, reduced noise, improved off-track capability (OTC), and reduced on-track error rate (OTER). It also also allows the sputtering process to be conducted at a substantially lowered temperature.

20 Claims, 4 Drawing Sheets

5μm

COCRNITA/CR MAGNETIC RECORDING MEDIUM

FIELD OF THE INVENTION

The present invention relates to improved thin-film magnetic recording media for use in preparing computer hard disks for data storage. More specifically, the present invention relates to cobalt-alloy-based thin-film hard disk magnetic recording media which provide many improved qualities, including increased recording density, reduced noise, improved off-track capability (OTC), and reduced on-track error rate (OTER), etc. The improved thin-film magnetic recording media disclosed in the present invention also allow the sputtering temperature to be lowered; thus the present invention not only reduces the production cost of computer hard disks, it can also substantially reduce the possibility of causing defects in the substrate during the sputter depositing process.

BACKGROUND OF THE INVENTION

Cobalt-alloy-based thin-film magnetic recording media have been increasingly used in the manufacturing of hard disks for read/write operations in computers. Thin-film magnetic recording media are typically prepared by sputtering a thin magnetic film, or the so-called magnetic recording layer, on a substrate, which is typically a textured aluminum or NiP substrate. A chromium- or chromium-alloy-based underlayer is typically provided which is sandwiched between the cobalt-alloy-based magnetic layer and the aluminum or NiP substrate. After the cobalt-alloy-based magnetic layer is sputtered on the chromium underlayer, a protective overcoat layer, which typically comprises a carbon overcoat, is then applied over the magnetic layer, also by sputtering.

A number of cobalt-alloy-based alloys have been developed and used as magnetic recording films for preparing the thin-film magnetic recording media. For example, U.S. Pat. No. 4,888,514 discloses a thin film magnetic recording disk containing a cobalt-nickel magnetic recording layer sputtered over a chromium underlayer. The magnetic disks prepared using the cobalt-nickel film were reported to exhibit a coercivity of 650 Oersteds (Oe), and a loop squareness ratio greater than 0.9.

Coercivity is defined as the magnetic field required to reduce the remanence magnetic flux to 0, i.e., the magnetic field required to erase a stored bit of information. A higher coercivity allows adjacent recorded bits to be placed more closed together in a medium without mutual cancellation. Thus a higher coercivity is preferred for high density disks. Loop squareness is defined as the ratio of coercivity to the magnetic saturation field. As the saturation field becomes smaller, approaching the coercivity, it would take less field strength to write to the medium. This ratio is typically referred to as an overwrite ratio, i.e., the ratio of the old signal residual to the new signal. A small overwrite ratio indicates good writability, and is thus preferred.

A number of cobalt-nickel and cobalt-nickel-chromium alloys based magnetic layers have been developed. They are disclosed in, for example, U.S. Pat. Nos. 4,833,044, 4,816,127, and 4,735,840. In an attempt to improve the performance of cobalt-alloy-based magnetic hard disks, a four-component cobalt-alloy-based magnetic layer was developed containing 70–80 atom percent cobalt, 10–20 atom percent chromium, 3–20 atom percent platinum, and 2–10 atom percent tantalum. This magnetic recording medium, which was disclosed in U.S. Pat. No. 5,049,451, exhibited a coercivity of less than 2,000 Oe.

In light of the increasing need for larger capacity hard disks, it is always desirable to develop new magnetic media which would provide improved read/write properties. Preferably, the magnetic recording media would exhibit a coercivity greater than 2,000 Oe and can be used for making hard disks with a capacity of at least 2 GB.

SUMMARY OF THE INVENTION

The primary object of the present invention is to develop an improved thin film magnetic recording medium with improved read/write characteristics. More specifically, the primary object of the present invention is to develop an improved cobalt-alloy-based thin film magnetic recording medium which provides increased recording density, reduced noise, improved off-track capability (OTC), and reduced on-track error rate (OTER), etc. The magnetic recording medium disclosed in the present invention exhibits a coercivity of greater than 2,800 Oe even at magnetic saturation (Mrt) of less than 0.6.

The magnetic recording layer disclosed in the present invention is a four-component cobalt-alloy-based magnetic layer containing 66–78 atom percent of cobalt, 12–16 atom percent of chromium, 6–10 atom percent of nickel, and 4–8 atom percent of tantalum. The magnetic recording layer, preferably provided at a thickness of about 120–250 Å, is sputtered on top of a chromium underlayer, which is sputtered above an aluminum or NiP substrate. The chromium underlayer has a thickness preferably of about 300–700 Å.

By adding nickel atoms to the prior art three-component composition, unexpected results were observed in that the grains and the granular features of the resultant magnetic recording film showed a substantially finer and better-defined structure. The magnetic hard disk prepared incorporating the four-component system of the present invention also exhibited reductions in noise, improvements in the signal-to-noise ratio (SNR), as well as improvements in off-track capability (OTC) and on-track error rate (OTER).

Another advantage observed from the novel CoCrNiTa four-component magnetic recording layer of the present invention is that it requires a substantially lower sputtering temperature to deposit the magnetic recording layer on the chromium underlayer than the prior art processes. Lowered sputtering temperature reduces the possibility of causing defects in the aluminum or Ni/P based substrates during the sputter deposition process.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses a novel four-component thin film magnetic recording medium with improved read/write characteristics. The magnetic recording layer disclosed in the present invention contains about 66–78 atom percent of cobalt (Co), about 12–16 atom percent of chromium (Cr), about 6–10 atom percent of nickel (Ni), and about 4–8 atom percent of tantalum (Ta). In a preferred embodiment of the present invention, the magnetic recording layer has a thickness of about 120–250 Å. The magnetic recording layer is sputter deposited on top of a chromium- or chromium-alloy-based underlayer (hereinafter referred to as the chromium layer). The chromium underlayer has a thickness preferably of about 300–700 Å, which is sputter deposited above an aluminum or NiP substrate. After the magnetic layer is sputter deposited on the chromium underlayer, a protective overcoat layer, which is typically a carbon overcoat, is then applied over the magnetic layer, also by sputtering.

Unexpected results were observed when nickel atoms were added to the prior art three-component composition, as demonstrated in the present invention. It was observed that the grains and the granular features of the four-component magnetic recording film of the present invention showed a substantially finer and better-defined granular structure than the prior art three-component system. The magnetic hard disk prepared incorporating the four-component system of the present invention also exhibited reductions in noise, improvements in the signal-to-noise ratio (SNR), as well as improvements in off-track capability (OTC) and on-track error rate (OTER).

Additionally, the four-component magnetic recording layer of the present invention can be sputter deposited onto the chromium underlayer as a substantially reduced temperature. This reduces the risk of causing defects in the substrate. The ability to produce hard disks with lesser defects is another very important advantage of the present invention.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 1:
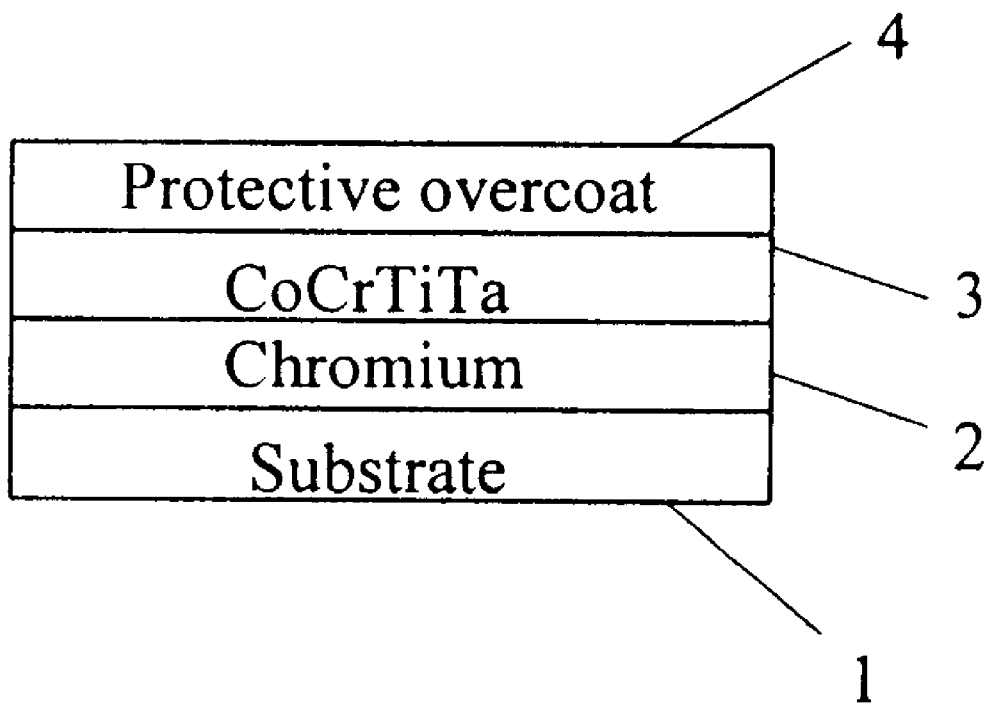
FIG. 1 is a schematic cross-section view of the multi-layered thin-film magnetic medium disclosed in the present invention.

FIG. 1 is a schematic cross-section view of the multi-layered thin-film magnetic media disclosed in the present invention. The magnetic media comprise a substrate 1, a chromium underlayer 2 sputter deposited on the substrate, a four-component magnetic recording layer 3 deposited, also by sputtering, on the chromium layer, and a protective overcoat 4 above the magnetic recording layer. The four-component magnetic recording layer contains 72 atom percent cobalt, 14 atom percent chromium, 8 atom percent nickel, and 6 atom percent tantalum, and is designated as CoCrNiTa (72/14/8/6). The chromium underlayer 2 has a thickness of about 500 Å. The thickness of the underlayer can be controlled by a number of sputtering parameters, such as sputter pressure, target power, voltage, deposition time, etc.

The magnetic recording layer was sputter deposited on the chromium underlayer under conditions as shown in the following Table 1.

TABLE 1

|  | CoCrTa (84/10/6) | CoCrNiTa (72/14/8/6) |
| --- | --- | --- |
| IR Heater | 2.1/2.7 (240° C.) | 1.81/2.10 (180° C.) |
| Cr thickness (Å) | 500 | 500 |
| Overcoat thickness (Å) | 120 | 125 |
| Bias (volt) | −200 | −200 |
| Flow rate (sccm) | 35 | 20 |
| Gun Type | CM | RM/CM |

Comparative Example 1

Similar magnetic media were prepared which contained the prior art three-component magnetic recording layer containing cobalt (84 atom percent), chromium (10 atom percent), and tantalum (6 atom percent). The three-component magnetic recording layer was sputter deposited on the same chromium underlayer having a thickness of 500 Å. The sputtering conditions are also summarized in Table 1.

Comparison of Magnetic Recording Media Prepared in Example 1 and Comparative Example 1

Figure 2:
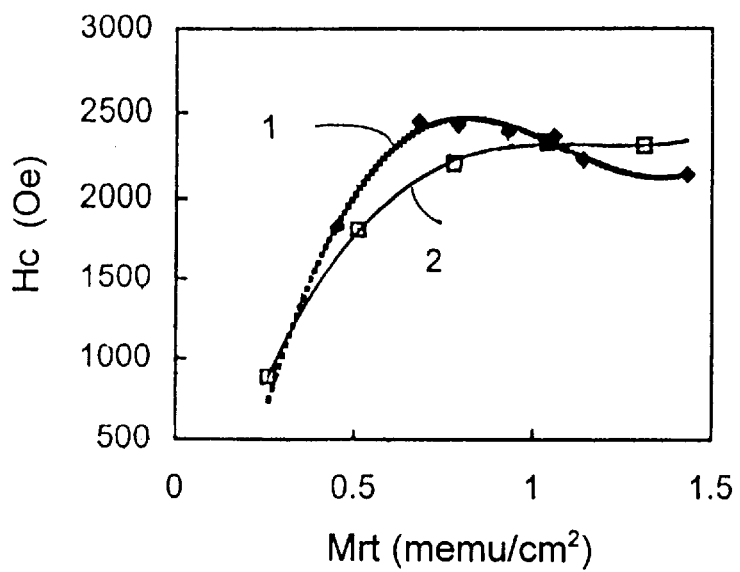
FIG. 2 shows plots of coercivity, Hc (Oe) vs. magnetic remanence Mrt (memu/cm$^2$) measured from various samples of the four-component CoCrNiTa system of the present invention and those of the three-component CoCrTa system of prior art.

FIG. 2 shows plots of coercivity, Hc (Oe) vs. magnetic remanance, Mrt, (memu/cm$^2$) measured from various samples of the four-component CoCrNiTa of the present invention (Example 1) and those of the three-component CoCrTa of prior art (Comparative Example 1). The parameter of magnetic remanence, Mrt, is a measure of the thickness of the magnetic recording layer. The greater the magnetic remenance, the greater is the thickness of the magnetic recording layer. For the CoCrNiTa and CoCrTa systems, a magnetic remenance of 0.5 corresponds approximately to a thickness of about 160 Å. Typically, the magnetic remenance of the magnetic recording layer should be kept between 0.4 and 1.0, preferably between about 0.5 and 0.8, depending on the design of the driver.

FIG. 2 clearly shows the superior advantage of the four-component CoCrNiTa system of the present invention relative to the prior art three-component CoCrTa system. The coercivities Hc measured from the magnetic media containing the CoCrNiTa magnetic recording layer of the present invention are about ten percent greater than those containing the CoCrTa magnetic recording layer.

It should also be noted that, as indicated in Table 1 above, the sputtering temperature for the CoCrNiTa system of the present invention (180° C.) was substantially lower than that of the CoCrTa system (240 ° C.). Yet superior results with respect at least to coercivity were still obtained from the present invention. The coercivity of the magnetic media containing the CoCrNiTa magnetic recording layer would exceed 2,800 Oe, at sputtering temperatures of 200° C. or above. On comparison, the coercivity of the CoCrTa could not exceed 2,400 Oe. The prior art systems required higher sputtering temperature, which also increases the possibility of causing defects on the substrates.

Figure 3:
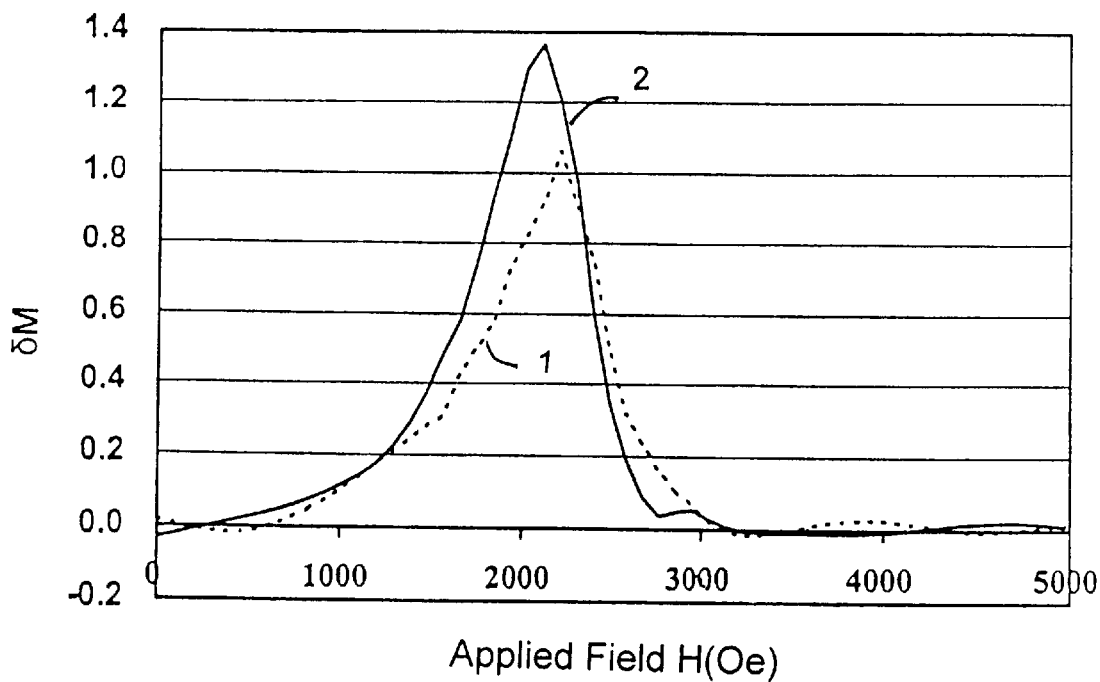
FIG. 3 shows plots of magnetic moment δM vs. applied magnetic field, H (memu/cm$^2$) measured from the four-component CoCrNiTa of the present invention and the three-component CoCrTa of prior art.

FIG. 3 shows plots of magnetic moment δM vs. applied magnetic field, H (memu/cm$^2$) measured from the four-component CoCrNiTa of the present invention and the three-component CoCrTa of prior art. The four-component CoCrNiTa film of the present invention shows a broader and lower-valued δM curve comparing to the CoCrTa film. This indicates that the grains in the CoCrNiTa film were more isolated than those in the CoCrTa film. It also explains why the CoCrNiTa film has a lower coercivity squareness, S*.

EXAMPLE 2

A magnetic medium was prepared which contained the same magnetic recording layer contains as in Example 1, i.e., 72 atom percent cobalt, 14 atom percent chromium, 8 atom percent nickel, and 6 atom percent tantalum, but was sputter deposited at a lower temperature, approximately 160° C., so as to lower its coercivity to the level comparable to that of the three-component CoCrTa system. A number of performance tests were conducted to compare the magnetic media prepared from these two systems, and the results are summarized in Table 2.

TABLE 2

|  | Hc | Mrt | S* | PW | SNR | Noise | OTER | OTC |
|---|---|---|---|---|---|---|---|---|
| CoCrNiTa | 2,260 | 0.76 | 0.80 | 16.2 | 14.7 | −23.6 | −14.45 | 50.9 |
| CoCrTa | 2,220 | 0.75 | 0.84 | 15.9 | 13.3 | −22.9 | −12.58 | 42.4 |

Table 2 shows that the four-component CoCrTiTa system of the present invention is superior than the three-component CoCrTa system in many aspects, including coercivity squareness S* (0.84 vs. 0.80), signal-to-noise ratio SNR (14.7 vs. 13.3), noise (−23.6 dB vs.−22.9 dB), reduced on-track error rate OTER ($10^{-14.45}$ vs. $10^{-12.58}$), off-track capability OTC (50.9 vs. 42.4). It should be noted that the four-component magnetic recording layer of the present invention was intentionally fabricated at a condition substantially less than the optimum (so that it coercivity can be lowered to that similar to a three-component system). However, even at similar levels of coercivity, the four-component system of the present invention still showed substantially superior quality than the three-component system.

Figure 4A:
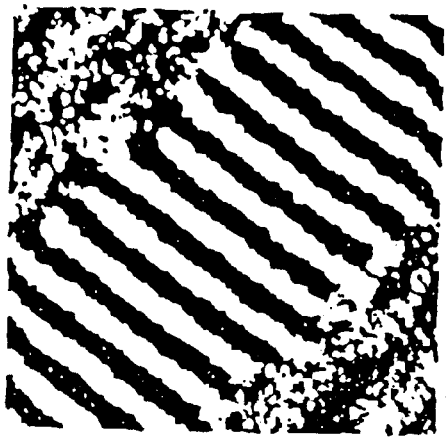
FIG. 4a shows MFM image of a prior magnetic recording layer containing CoCrTa, measured at 100 kFCI.
Figure 4B:
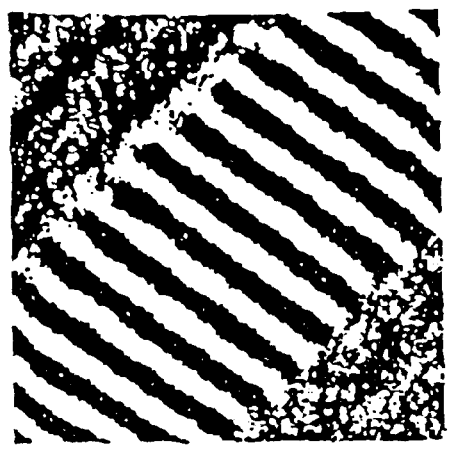
FIG. 4b shows MFM image of an embodiment of the magnetic recording layer of the present invention containing CoCrNiTa, measured at 100 kFCI.
Figure 5A:
FIG. 5a shows MFM image of a prior magnetic recording layer containing CoCrTa, measured at 200 kFCI.
Figure 5B:
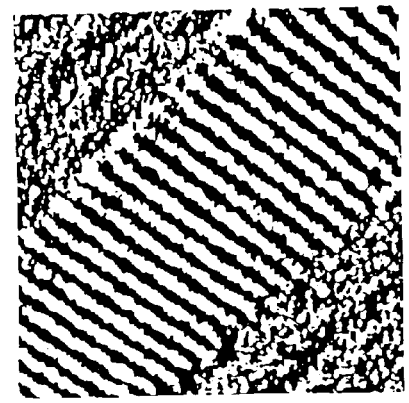
FIG. 5b shows MFM image of an embodiment of the magnetic recording layer of the present invention containing CoCrNiTa, measured at 200 KFCI.
Figure 6A:
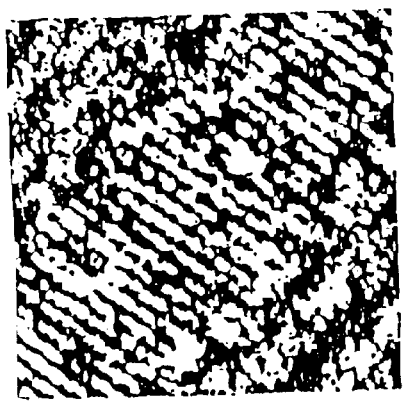
FIG. 6a shows MFM image of a prior magnetic recording layer containing CoCrTa, measured at 240 KFCI.
Figure 6B:
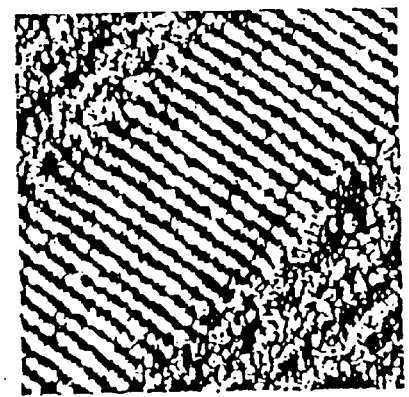
FIG. 6b shows MFM image of an embodiment of the magnetic recording layer of the present invention containing CoCrNiTa, measured at 240 kFCI.

FIG. 4a shows MFM (magnetic force microscope) image of a prior magnetic recording layer containing CoCrTa, measured at 100 kFCI (thousand flux changes per inch); FIG. 4b shows MFM image of an embodiment of the magnetic recording layer of the present invention containing CoCrNiTa, measured at 100 kFCI. FIGS. 5a, 5b and 6a, 6b are the same set of MFM images at 200 kFCI and 240 kFCI, respectively. These MFM images clearly show that the four-component CoCrNiTa film of the present invention contained finer grains and the granular features are better defined, than the three-component CoCrTa film.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A magnetic recording medium comprising:
   (a) a substrate; and, in the order away from said substrate
   (b) an underlayer; and
   (c) a magnetic recording layer;
   (d) wherein said magnetic recording layer comprises 66–78 atom percent of cobalt, 12–16 atom percent of chromium, 6–10 atom percent of nickel, and 4–8 atom percent of tantalum.

2. The magnetic recording medium according to claim 1 which further comprises an overcoat sputter deposited after said magnetic recording layer.

3. The magnetic recording medium according to claim 1 wherein said magnetic recording layer has a thickness of about 120–250 Å.

4. The magnetic recording medium according to claim 1 wherein said underlayer contains chromium.

5. The magnetic recording medium according to claim 4 wherein said chromium underlayer has a thickness of about 300–700 Å.

6. The magnetic recording medium according to claim 1 wherein said underlayer is a chromium underlayer having a thickness of about 300–700 Å.

7. The magnetic recording medium according to claim 1 wherein said magnetic recording layer is sputter deposited on said underlayer at a temperature less than 220° C.

8. The magnetic recording medium according to claim 7 which has a coercivity greater than 2,400 Oe.

9. The magnetic recording medium according to claim 1 wherein said magnetic recording layer is sputter deposited on said underlayer at a temperature less than 200° C.

10. The magnetic recording medium according to claim 9 which has a coercivity of greater than 2,400 Oe.

11. A process for making magnetic recording media comprising the steps of:
   (a) sputter depositing an underlayer on a substrate;
   (b) sputter depositing a magnetic recording layer on said underlayer; wherein said magnetic recording layer comprises 66–78 atom percent of cobalt, 12–16 atom percent of chromium, 6–10 atom percent of nickel, and 4–8 atom percent of tantalum.

12. The process for magnetic recording media according to claim 11 which further comprises the step of sputter depositing an overcoat on said magnetic recording layer.

13. The process for magnetic recording media according to claim 11 wherein said magnetic recording layer has a thickness of about 120–250 Å.

14. The process for magnetic recording media according to claim 11 wherein said underlayer contains chromium.

15. The process for magnetic recording media according to claim 14 wherein said chromium underlayer has a thickness of about 300–700 Å.

16. The process for magnetic recording media according to claim 11 wherein said underlayer is a chromium underlayer having a thickness of about 300–700 Å.

17. The process for magnetic recording media according to claim 11 wherein said magnetic recording layer is sputter deposited on said underlayer at a temperature less than 220° C.

18. The process for magnetic recording media according to claim 17 wherein said magnetic recording media have a coercivity greater than 2,400 Oe.

19. The process for magnetic recording media according to claim 11 wherein said magnetic recording layer is sputter deposited on said underlayer at a temperature less than 200° C.

20. The process for magnetic recording media according to claim 19 which has a coercivity greater than 2,400 Oe.

* * * * *